April 16, 1968     R. W. HARRISON ET AL     3,378,671
NONCONSUMABLE ARC-MELTING AND ARC-WELDING ELECTRODES
Filed Oct. 14, 1965
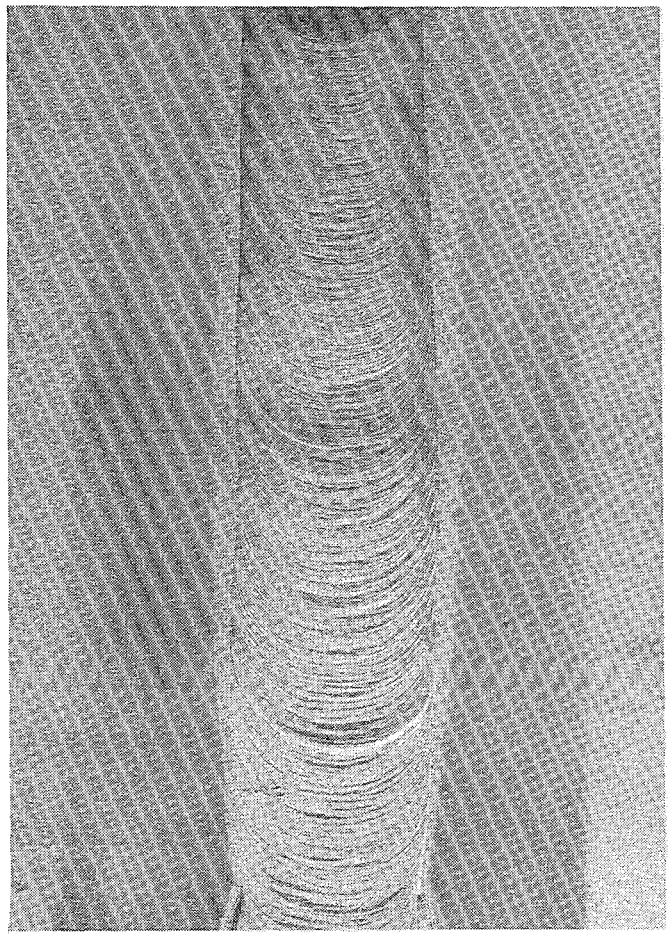
INVENTORS
ROBERT W. HARRISON
EUGENE J. DELGROSSO
BY M. B. Tasker
ATTORNEY

United States Patent Office 3,378,671
Patented Apr. 16, 1968

3,378,671
NONCONSUMABLE ARC-MELTING AND
ARC-WELDING ELECTRODES
Robert W. Harrison, Cincinnati, Ohio, and Eugene J. Delgrosso, Wallingford, Conn., assignors to United Aircraft Corporation, East Hartford, Conn., a corporation of Delaware
Continuation-in-part of application Ser. No. 341,135, Jan. 29, 1964. This application Oct. 14, 1965, Ser. No. 505,099
20 Claims. (Cl. 219—145)

ABSTRACT OF THE DISCLOSURE

Nonconsumable arc-melting and arc-welding electrodes and a process for using such electrodes are provided. The electrodes are formed of a composition consisting essentially of 0.5–10% by weight of yttrium with the balance a reactive-refractory metal composition selected from titanium, zirconium, metals having a melting point of at least 1875° C., and alloys having as their base at least one of these metals. Typical electrode compositions include (a) 0.8% by weight of yttrium, about 1% by weight of zirconium, and balance essentially columbium, (b) 0.8% by weight of yttrium and balance essentially tantalum; and (c) 1.5% by weight of yttrium and balance essentially titanium. In the process, a nonconsumable electrode of the composition described is placed adjacent a metallic composition to be melted and an electric current is passed through the electrode and the metallic composition to establish an electric arc between them.

---

This application is a continuation-in-part of our application Ser. No. 341,135, filed Jan. 29, 1964, now abandoned.

This invention relates to novel and improved nonconsumable arc-melting and arc-welding electrodes and a process for using such electrodes. More particularly, this invention relates to such electrodes and a process for their use in the melting, purification, and welding of high melting point reactive-refractory metals and their alloys.

It will be understood that as used herein the term "reactive-refractory metals" refers to both titanium and zirconium, commonly termed the "reactive metals," and to those metals having melting points equal to or higher than that of chromium (1875° C.). The reactive-refractory metals of this application are thus: titanium, zirconium, chromium, vanadium, rhodium, hafnium, ruthenium, columbium, iridium, molybdenum, tantalum, osmium, rhenium, and tungsten.

In the past, the field of nonconsumable arc-melting electrodes for use in the melting, purification, and welding of high melting point reactive and refractory metals has practically been preempted by the thoriated-tungsten electrode, usually consisting of tungsten and thorium oxide or thoria. The thorium in the electrode provides an effective thermionic emitter to maintain the high intensity arc of the higher melting point metals.

With nonconsumable thoriated-tungsten electrodes, it has been necessary to provide an inert gas atmosphere, such as argon, to stabilize the arc. Below about 30 mm. Hg the arc becomes positionally unstable and no longer anchors on the molten pool. If the pressure is reduced still further, the arc becomes diffuse and spreads over a large area on both the anode and cathode so that it no longer supplies substantial heat to the molten pool. At still lower pressures (below 1000 microns) the arc leaves the molten pool entirely and goes upward along the electrode forming a cascade of long thin arcs. If this condition occurs for any length of time, serious damage to the furnace and burning of insulation is likely to occur.

Since it is necessary to maintain an inert gas atmosphere in the furnace when a thoriated-tungsten electrode is used to support the arc, it has not been possible in the past to melt refractory metals under low pressure or in a vacuum to promote purification by degassing. To remedy this dilemma, both the use of reducing agents having large negative free energies of formation with nonmetallic impurity elements and the two-step process of first melting a metal powder containing a deoxidizer with a nonconsumable electrode followed by a second melting in a vacuum have been recommended in the past.

It has become clear, however, that the ideal solution would be a safe nonconsumable electrode that would combine the desired functions of arc-melting in a vacuum at low melt rates with simultaneous powerful chemical reducing and gettering for removal of impurities from the melt.

Other disadvantages of the use of the thoriated-tungsten electrode for melting of reactive-refractory metals and their alloys—other than tungsten—are that tungsten may be washed into the molten pool through erosion of the electrode tip or through splashing of lower melting metals from the molten pool onto the electrode to cause formation of a low melting tungsten alloy which can then drip back into the melt.

When thoriated-tungsten electrodes are used for welding a more serious source of contamination than those just enumerated, can result if the electrode tip touches the molten weld causing the electrode to "stick." More often than not, when the operator tries to free the electrode after sticking has occurred, the tip breaks off and remains in the weld. When this happens, an extensive effort may be required to remove the tungsten by grinding away that portion of the weld that is tungsten-contaminated.

The seriousness of the tungsten inclusion problem in welds has become apparent through analysis of the causes of cracking of refractory metal ingots during fabrication. Radiography of cracked rods has indicated the presence of inclusions which have been identified by emission spectrography as tungsten. In these investigations, it has been clear that tungsten inclusions were caused by "sticking" of the tungsten welding electrode during preparation of the ingots.

At present, few successful techniques for casting shaped parts of reactive-refractory metals and their alloys are available. This is mainly because their high reactivity with mold materials too easily results in contaminaton of the metal being cast. Accordingly, most pieces of hardware produced from these metals are machined with the result that large quantities of scrap turnings are generated. This scrap, while essentially of high purity, almost always becomes oxidized as a result of machining. There has thus been a long-felt need for an economical method by which this scrap could be simultaneously remelted and deoxidized.

In Patent 3,163,744, issued on Dec. 29, 1964, to Simon S. Aconsky and James R. Doyle, on application Ser. No. 175,306, filed Feb. 22, 1962, copending with the parent application of this application, and assigned to the same assignee as this application, a nonconsumable arc-melting and arc-welding electrode is disclosed that permits the simultaneous melting and purification of reactive-refractory metals and their alloys.

The electrodes of Patent 3,163,744 achieve the ability of arc-melt in a dynamic vacuum at low melt rates together with the continuous yielding of a powerful volatile reducing and chemical gettering agent that combines with impurities, thereby allowing such impurities in gas or vapor chemical combination with the volatilized gettering agent to be withdrawn from the vicinity of the melt by a dynamic vacuum. Such electrodes are formed preferably from the same metal base as the reactive-refractory metal to be melted and cerium. The cerium content may vary from 3 to 25 volume percent of the electrode composition and is preferably about 9.7 volume percent. Such ceriated electrodes, in which cerium is uniformly distributed throughout the base metal, have proved highly satisfactory in use, but are also expensive because the cost of cerium at present is about $350.00 per pound.

In accordance with the present invention, it has been discovered that, in place of the approximately 10 volume percent of cerium required for ceriated electrodes, equally good or better results can be obtained by addition of yttrium to reactive-refractory metal-base electrodes in significantly smaller amounts than the amounts of cerium required. For example, the addition of as little as 0.8% by weight of yttrium to a Cb–1Zr–0.1C alloy (0.8 weight percent yttrium in such an alloy is the equivalent of about 1.2 volume percent) yields an electrode having nonmelting characteristics and gettering properties equivalent to those achieved by the addition of 9.7 volume percent to the same base alloy (Cb–1Zr–0.1C).

An yttriated electrode made of this alloy thus did not melt even though 5,600 amperes were passed through it to test its use as a nonconsumable arc-melting electrode. Moreover, it has been found that the gettering capabilities of yttrium when used with chromium are decisively better than those that can be obtained with any of the other rare earth metals.

As compared with difficult-to-obtain cerium costing about $350.00 per pound, yttrium can be purchased in sponge form for about $150.00 per pound and is readily available in reasonable quantities because of a Government-sponsored program to produce it in quantity as a moderator for nuclear reactors.

In view of the foregoing, it is a primary object of this invention to provide, at a relatively low cost, new and improved nonconsumable arc-melting and arc-welding electrodes that can be used for the simultaneous melting and purification of reactive-refractory metals and their alloys.

Such achievements are made possible by the capacity of the yttriated electrodes of this invention to arc-melt the reactive-refractory metals in a dynamic vacuum at low melt rates and simultaneously continuously to yield a powerful volatile reducing and chemical gettering agent that combines with interstitials or impurities in the melt and allows the chemically combined impurities and gettering agent to be withdrawn while in gas or vapor phase from the vicinity of the melt by a dynamic vacuum.

Other objects of this invention are to provide new and improved non-consumable, arc-melting electrodes: (1) that achieve the advantages of prior non-consumable electrodes without their disadvantages; (2) that permit less strict requirements in selection and preparation of raw materials; and (3) that provide a voltatile "getter" over the melt in a dynamic vacuum that permits removal of interstitials or impurities. Chemical compounds formed by combination of the volatile getter with the impurities are withdrawn from the vicinity of the melt, while in gas or vapor phase, by the dynamic vacuum.

Further objects of this invention are to provide new and improved nonconsumable arc-melting and arc-welding electrodes; (1) that will sustain an arc in dynamic vacuum; (2) that achieve high arc temperatures but maintain relatively low electrode temperatures; (3) that permit welding under a dynamic vacuum; (4) that achieve simultaneous melting and purification of reactive-refractory metals and their alloys by which metal powders may be economically consolidated into high purity ingots; (5) that provide a low cost method for remelting and re-purifying machinings and scraps of reactive-refractory metals; and (6) that have tips with areas of low thermionic work function that permit a high intensity arc-melting current to pass readily from the electrode to the melt.

It is a still further object of this invention to provide in a preferred form thereof, novel and improved non-consumable arc-melting and arc-welding electrodes for the reactive-refractory metals and their alloys in which the base metal of both the electrode and the metal to be melted or welded can be matched, thereby eliminating any problem of contamination of the melt or weld by accidental inclusion of base metal from the electrode.

Additional objects and advantages of the invention will be set forth in the description that follows, and in part will be obvious from the description, or may be learned by practice of the invention, the objects and advantages being realized and attained by means of the compositions and combinations particularly pointed out in the appended claims.

To achieve its objects and in accordance with its purposes, this invention embodies, as broadly described, nonconsumable arc-melting and arc-welding electrodes for use in melting or welding reactive-refractory metallic compositions, the electrodes being formed from a composition comprising from 0.5 to 10% by weight of yttrium and the balance reactive-refractory metal composition selected from the group of reactive-refractory metals consisting of titanium, zirconium, those metals having a melting point of 1875° C. or higher, and their alloys.

As used in the specification and claims it will be understood that the term "reactive-refractory metal composition" refers both to the individual reactive-refractory metals, such as, Ti, Zr, Cb, Mo, Cr, V, W, Ta, and the like, and to alloys having one or more of the reactive-refractory metals as their base, such as, for example, Cb–1Zr–0.1C, or Cb–15Ta–1Zr–0.1C (percent by weight).

In a preferred embodiment, the nonconsumable arc-meltin ang arc-welding electrode of this invention is formed from a composition consisting essentially of from 0.5 to 3% by weight of yttrium an dthe balance a reactive-refractory metal composition selected from the group of reactive-refractory metals consisting of titanium, zirconium, metals having a melting point of 1875° C. or higher, and their alloys.

In its most preferred form, this invention embodies an electrode as above described but having an yttrium content of about 0.7 to 1% by weight.

Yttrium should always be present in the electrode in at least 0.5% by weight so that sufficient yttrium will be available to ensure effective gettering of the melt. The yttrium content of the electrode should not exceed 10% by weight, however, or the yttrium may melt and run down the electrode causing inefficient yttrium loss and probable contamination of the melt. An yttrium content of about 0.8% by weight has been found to be optimum.

The use of about 0.7% to 1% by weight of yttrium is economical and is sufficient to give adequate gettering power for almost all alloys of reasonable commercial purity, including turnings, shavings, or scrap from commercially pure alloys that have become oxidized. This quantity of yttrium has generally been found adequate to remove sufficient quantities of oxygen from scraps or turnings of alloys that were of reasonable purity before machining to return such alloys to their original state or to a higher state of purity.

For example, columbium of relatively high commercial purity usually contains from about 300 to 500 p.p.m. of oxygen. Such oxygen levels can be significantly reduced by the use of an yttriated electrode containing as little as 0.5% by weight of yttrium. The main requirement is that the electrode contain sufficient yttrium to ensure reaction with the amount of oxygen which it is desired be removed. In like manner it has been discovered that to reduce the oxygen level in a Cb-base alloy from 1000 p.p.m. to 100 p.p.m. requires approximately 0.8% by weight of yttrium. Significantly, 1000 p.p.m. of oxygen is a typical level found in Cb-base scrap materials. Such Cb-base scrap would have to be rejected for many uses unless purified by oxygen removal.

In accordance with the invention, when yttriated electrodes are to be reused or to be used to melt or purify more than one reactive-refractory metal ingot, charge, or specimen, a higher content of yttrium than 0.7 to 1% is desirable. Similarly, when such electrodes are to be used for melting and purifying reactive-refractory metals of relatively high oxygen content, it is also advantageous that higher quantities of yttrium be included in the electrodes. In such instances, the electrodes of this invention may thus include yttrium in amounts of up to 10% by weight.

In accordance with the invention, it has been discovered that removal of 1 atom of oxygen from a reactive-refractory metallic composition generally requires about 1.4 atoms of yttrium.

As specific examples, an alloy containing 340 p.p.m. (0.206 atomic percent) of oxygen and an alloy containing 240 p.p.m. of oxygen (0.135 atomic percent) each were found to require 0.44 atomic percent of yttrium to remove 130 p.p.m. (0.70 atomic percent) of oxygen.

The purest and most expensive commercially available columbium used for preparing alloys typically contains from 300 p.p.m. (0.18 atomic percent) to 500 p.p.m. (0.30 atomic percent) of oxygen. To melt this material and simultaneously purify it to a level of 100 p.p.m. (0.055 atomic percent) of oxygen normally requires from 0.21% by weight (0.22 atomic percent) to 0.55% by weight (0.57 atomic percent) of yttrium.

Similarly, to reduce the oxygen level from 1000 p.p.m. (0.64 atomic percent) in columbium, which would otherwise have to be rejected for many uses, to 100 p.p.m. (0.055 atomic percent) of oxygen requires approximately 0.8% by weight (0.92 atomic percent) of yttrium.

In the latter instance, it is thus necessary to include a greater amount of yttrium than the 0.7 to 1% by weight required to avoid exhausting all the yttrium in the electrode. If the yttrium level in the electrode should drop below 0.5% by weight, there is danger of melting the electrode.

Accordingly, to reduce oxygen contamination in Cb-base scrap from 1000 p.p.m. to 100 p.p.m. calls for an yttriated electrode containing at least about 1.3% by weight of yttrium. The most preferred embodiment of the invention in which the yttrium content is 0.7 to 1% by weight thus is based in part on the amount of yttrium normally required to reduce oxygen content of high commercial purity columbium from a level of 300–500 p.p.m. down to a level of about 100 p.p.m.

In accordance with the invention, the use of the nonconsumable arc-melting yttriated electrodes of this invention, formed from a reactive-refractory metal composition and the above described quantities of yttrium, permits safe, nonconsumable arc-melting of reactive-refractory metals and their alloys in a dynamic vacuum. Since melting with a conventional nonconsumable thoriated-tungsten electrode cannot safely be accomplished in vacuum or at greatly reduced pressures, the ability of the electrodes of this invention to sustain a high intensity melting arc in a dynamic vacuum is by itself a great stride forward in the art.

In addition to the ability to sustain an arc in a vacuum, however, the electrodes of this invention also provide a powerful reducing and gettering agent in the form of yttrium vapor or an yttrium ion atmosphere in the vicinity of the arc just above the melt. Yttrium has high negative free energies of formation with nonmetallic impurity elements in the melt, particularly oxygen. The yttrium vapor reacts with impurities, such as oxygen, that are present as interstitials in the melt forming vapor phase yttrium compounds with these impurities, which can then be withdrawn from the furnace by dynamic vacuum.

In accordance with this invention, it is thus possible to achieve melts of reactive-refractory metallic compositions of unusually high purity by removal of interstitial impurities during the melting process itself. The electrodes of this invention are particularly effective in removing oxygen when it is present as an interstitial impurity in melts of reactive-refractory metal compositions.

Further in accordance with the invention, the yttriated electrodes of this invention can be readily made by conventional metal fabricating processes. Surprisingly, although a small addition of yttrium prevents melting of a reactive-refractory metal electrode when high amounts of electric current are passed through it, thereby making possible its use as a nonconsumable electrode, the yttrium containing reactive-refractory alloy from which such electrodes are formed can be readily melted when heat is externally supplied. An example of such external heat is an arc from a conventional thoriated-tungsten electrode in an argon partial pressure atmosphere—the conventional nonconsumable melting technique. The yttrium-containing electrodes of this invention are preferably prepared by arc-melting the alloy ingredients using nonconsumable yttriated electrodes of this invention as the heat source.

Ingots of the composition from which the electrodes of this invention are formed can be cast by conventional arc-melting techniques. Ingots can also be prepared by canned hot extrusion of a mixture of yttrium and the other components of the reactive-refractory metal composition, or by similar methods and combinations of melting and hot working familiar to those skilled in the art.

Ingots so produced can then be fabricated by standard metallurgical procedures, such as extrusion, swaging, forging, drawing, and the like, into electrode rods, wires, bars, or other desired shapes.

Almost no yttrium is lost in preparing a Cb-Y electrode by melting, because the vapor pressure of yttrium remains fairly low at temperatures as high as 4500° F., which is either close to or above the melting point of most reactive-refractory metals. Of course, minor losses of yttrium during primary melting can be compensated for by using excess yttrium in the charge.

For a clearer understanding of the invention, specific examples illustrating it are given below. These examples are illustrative only and are not to be understood as limiting the scope and underlying principles of the invention.

The preparation of a typical Cb-Y electrode, in accordance with this invention, is carried out in the following manner: columbium and yttrium metal powders are carefully weighed and finely ground, separately, to 50 to 100 mesh (Taylor Standard). These metal powders are then roll blended in a dry box under argon at a pressure of ⅓ atmosphere. The resulting metal powder mixture is then compacted in the dry box. The grinding, blending and compacting are all carried out under the argon atmosphere to avoid atmospheric contamination.

The compacted mixture is then placed in a steel or columbium container, which is welded shut, evacuated, and then sealed, while under vacuum or reduced pressure. The sealing can be carried out, for example, by crimp sealing the steel or columbium container while the external vacuum pump remains on.

The compacted product is then extruded at about 2000° F. under a protective argon atmosphere, at a reduction rate of from about 6:1 to about 8:1. The exterior steel or columbium covering for the extruded sample is removed by machining, or the like.

In carrying out the examples described below, all of the melting is performed in a conventional arc-melting furnace. Preferably, the furnace includes a water-cooled sightport, extending radially from the chamber which permits direct visual and photographic observation of the arc. The arc-melting process can thus be studied by both visual observations and mechanical data recordings.

The furnace is equipped with a 1350 to 3000 ampere D.C. rectifier. A liquid air coldtrap and a mechanical pump are provided for evacuation of the chamber, and power is supplied to the electrode through a water-cooled "stinger."

During normal operation the yttriated electrode is the "hot" or negative lead. The crucible used for most of the melting operations is a water-cooled copper hearth having a series of depressions on which pressed powder compacts are melted. This crucible is connected to the positive pole and grounded. The melting chamber is completely water-cooled.

During a normal melting operation, the powder compacts are placed into depressions in the water-cooled hearth or crucible. A central shallow depression is used as a titanium "getter-button." After the compacts are inserted and the furnace closed, the furnace is evacuated to a pressure of about 10 to 20 microns. The furnace chamber is then argon flushed and re-evacuated to that pressure a minimum of three (3) times prior to melting.

The method used to initiate melting varies with the type furnace used. Thus when a Canel-Arc furnace is used, melting is initiated by physically "striking off" the yttriated electrode to the titanium "getter-button" and melting it for a period of about one minute. When a Heraeus furnace is used, the melting is initiated by jumping the gap with high frequency ignition.

In the button or compact melting procedures, once the "getter-button" is melted and the arc established, the vacuum valve is opened, and the arc is "walked" over to a compact. Melting then proceeds from compact to compact around the mold.

In the examples dealing with the production of castings, no walking from compact to compact is, of course, involved, and once the arc is established the single metal charge is melted to produce the desired casting.

When the operator is satisfied that he has achieved good penetration and mixing of the molten metal, the melting current is shut off.

In button melting, the above described melting procedure is repeated three to six times. In the examples illustrating the production of castings, however, there is no repetition of the melting process.

In the following examples, the pressure of the furnace during melting under dynamic vacuum generally stabilizers at about 400 to 800 microns, indicating the presence of yttrium vapor or an yttrium ion atmosphere in the vicinity of the arc. The process, of course, can be carried out at other conditions of dynamic vacuum.

Generally, however, it is desirable that the arc-melting and arc-welding take place at the lowest possible pressure. This avoids contamination from the atmosphere and promotes purification. As can be seen from the following examples, very substantial and unexpected interstitial purification thus occurs during melting when the yttrium-containing electrodes of this invention are used.

The pressure in the vicinity of the melt or weld is, of course, somewhat dependent on the capacity of the vacuum pump used.

*Example 1*

An electrode consisting essentially of, by weight, 1% zirconium, 0.8% yttrium, balance essentially columbium (Cb–1Zr–0.8Y), was used to weld together two Cb–1Zr sheets, using a Cb–1Zr welding rod.

After initial strike-off in a welding box, under argon, the pressure in the box was reduced to 600 microns of argon by evacuation. On this reduction of the pressure, a cone-shaped flow discharge appeared at the electrode tip and radiated outwardly and downwardly towards the work.

Welding was then initiated, and the weld shown in the figure of the drawing herein (which is enlarged about four (4) times actual size) was produced. As can be seen, the area covered by the cone-shaped flow, including the weld and a narrow zone on each side of it, was extremely clean as compared to the adjacent area.

Preweld analysis of the filler rod showed 260 p.p.m. of oxygen, and postweld analysis of the weld piece showed that this oxygen content had been reduced to 145 p.p.m. during welding.

For purposes of comparison, the above run was repeated, substituting a Cb–1Zr electrode for the Cb–1Zr–0.8Y electrode originally used.

Preweld analysis of the filler rod in this comparison showed the same 260 p.p.m. oxygen. However, post-weld analysis of the weld piece showed that the oxygen content had increased to 400 p.p.m. during welding with the Cb–1Zr electrode—an undesirable and opposite result from that obtained with Cb–1Zr–0.8Y electrode.

These two examples indicate that there was a significant *decrease* in the oxygen content of the final weld piece when an yttriated electrode was used; but there was a significant *increase* in oxygen contamination during welding when an electrode that did not contain yttrium, but which was otherwise identical, was used.

Thus it is established by this example that the important decrease in oxygen content during welding in accordance with this invention is directly attributable to the presence of yttrium in the electrode.

*Example 2*

The procedure of Example 1 was repeated in this example except that the two sheets welded together and the weld rod used were all essentially pure Cb. Again, the electrode used in this example was also a Cb–1Zr–0.8Y electrode such as that used in Example 1. The results obtained in this example were substantially the same as those of Example 1, with the post-weld analysis of the weld piece showing a substantial decrease in oxygen content during welding from the content shown by a preweld analysis of the filler rod.

*Example 3*

In this example the procedure of Example 1 was again repeated, except that sheets of essentially pure Cb were welded to sheets consisting essentially of Cb–1Zr, using both Cb–1Zr and essentially pure Cb welding rods. The results of this example were substantially the same as those obtained in Example 2.

*Example 4*

In this example, the procedure of Example 1 was again repeated, except that here the sheets welded to each other consist essentially of Cb–1Zr–0.1C alloy. The weld rod here used consists essentially of the same Cb–1Zr–0.1C alloy. The results of this example were also substantially the same as those obtained in Example 2.

*Example 5*

The procedure of Example 1 was duplicated in this example, except that the composition of the electrode used here was Cb–1Zr–1.5Y. Here, as in Example 1, a substantial reduction in the oxygen content of the final weld-piece was evidenced by comparison with the oxygen content of the filler rod before welding.

This reduction of oxygen content was again shown to result directly from the yttrium content of the electrode, by running a comparative example in exactly the same manner except that the electrode used was essentially Cb–1Zr. In this latter run, as in the comparison run of Example 1, a substantial gain in oxygen content occurred during welding. This gain in oxygen content was shown by a comparison of the pre-weld analysis of the filler rod with a post-weld analysis of the weld piece.

*Example 6*

In this example columbium alloy (Cb–1Zr) finger castings of excellent quality were made in a Heraeus arc furnace by vacuum casting under a reduced pressure of about 600 microns using a Cb–1Zr–0.8Y electrode.

Previously, finger castings of this type could be made only in an argon atmosphere having an argon pressure of at least ⅓ atmosphere. That amount of pressure was necessary to support the arc of a thoriated tungsten electrode. With this prior method, it was necessary for argon to be displaced by molten metal before the casting cavity could be filled. Undesirable bubbling of argon usually resulted when the argon was displaced in the mold cavities by the molten metal, and this bubbling caused poor surface quality in the resulting castings.

The use of an yttriated electrode, in accordance with this invention, in this example, made possible the use of dynamic vacuum melting, at very greatly reduced pressures (i.e., in this example, 600 microns). At these greatly reduced pressures, no significant displacement of gas occurred, and excellent quality castings were made in intricate shapes.

Example 7

In this example the vacuum casting procedure of Example 6 was repeated except that the Cb alloy here used to make the castings consisted essentially of 20% titanium, and the balance essentially columbium (Cb-20Ti). The results obtained in this example were substantially the same as those of Example 6, with excellent quality finger castings being produced at a pressure of about 600 microns.

Example 8

In this example the vacuum casting procedure of Example 6 was again repeated, except that here the alloy used to produce the finger castings was a Ti-base alloy consisting essentially of 5% aluminum, 0.2% carbon, balance essentially titanium (Cb-5Al-0.2C). The Cb-1Zr-0.8Y electrode of Example 6 was used in this example. Here again finger castings of excellent quality were produced at extremely high vacuums on the order of 600 microns.

Example 9

In this example the procedure of Example 6 was repeated, except that here an electrode consisting essentially of 0.8% yttrium and the balance essentially tantalum (Ta-0.8Y) was substituted for the Cb-1Zr-0.8Y electrode used in Example 6. Using this electrode, finger castings of excellent quality were again produced from Cb-1Zr alloys at very high vacuums on the order of 600 microns.

Example 10

In this example a titanium base alloy consisting essentially of 6% aluminum, 3% zirconium and the balance essentially titanium (Ti-6Al-3Zr) was arc-melted in the form of a 1″ x 1″ x 4″ ingot bar. The melting was non-consumable, with a Cb-1Zr-1Y electrode.

The Ti-base alloy melted in this example was prepared by mixing titanium, aluminum, and zirconium in the specified amounts in the form of metal powders, compounding this metal powder mixture, melting the mixture, and extruding the above described bars. The melting of the titanium base alloy with the yttrium containing electrode of this example was carried out in an arc furnace.

The melted alloy product of this example contained interstitial oxygen in the amount of 830±50 p.p.m. This interstitial oxygen content was substantially lower than that present in the alloy prior to its being melted with the yttrium-containing electrode. This example thus illustrates the beneficial reduction in interstitial oxygen obtained by melting with the yttrium-containing electrodes of this invention. The melt product of this example had an average Brinell hardness number of 1.

Examples 11–12

In these examples Ti-base alloys having the composition Ti-6Al-2Zr were prepared in the form of 1″ x 1″ x 4″ ingot bars by the procedure of Example 10. Two (2) such bars were then melted in an arc furnace. The Ti alloy bar of Example 11 was melted using an yttrium containing electrode consisting essentially of 1% yttrium and the balance essentially tantalum (Ta-1Y). The titanium alloy bar of Example 12 was melted with a conventional thoriated tungsten (W-Th) electrode.

A comparison of interstitial oxygen and nitrogen contents of the melt products of Examples 11 and 12 clearly illustrates the effect of yttrium in the electrodes of the instant invention on the interstitial oxygen content of the products melted using these electrodes. The results are set forth in Table 1 below.

TABLE 1

| Example No. | Electrode | Final Interstitial Content (p.p.m.) | |
|---|---|---|---|
| | | Oxygen | Nitrogen* |
| 11 | Ta-1Y | 880±50 | 310±45 |
| 12 | W-Th (conventional) | 1,700±50 | 280±45 |

*Yttrium effectively reduces interstitial nitrogen content at only about one fourth to one fifth the rate at which it reduces oxygen content. This nitrogen reduction is observable mainly when relatively large nitrogen concentrations are present in the alloy being melted. In other cases such as those involved in these examples the changes may be so small as to be within the limits of experimental and measurement error.

The average Brinell hardness number of the melt product of Example 11 was 2, while the average Brinell hardness number for the melt product of Example 12 was 22. It will be noted that the Ti alloys melted with the yttrium containing electrodes of this invention in these and the following examples were much softer and more ductile than the same alloys melted with conventional thoriated-tungsten electrodes. These examples thus illustrate the beneficial purification and improvement in ductility of Ti alloys attributable to removal of interstitial hardening elements by the yttrium electrodes in accordance with the findings of the invention.

Examples 13–14

The procedure of Examples 11–12 was repeated in these examples, except that the alloys melted here were 7% aluminum, 3% zirconium, balance essentially titanium (Ti-7Al-3Zr). These alloys were produced by the same method used in Example 10, and were also melted in the form of 1″ x 1″ x 4″ ingot bars. A Ta-1Y electrode was used in Example 13, and a conventional thoriated-tungsten (W-Th) electrode was used in Example 14. The results of these examples were as shown in Table 2 below.

TABLE 2

| Example No. | Electrode | Final Interstitial Content (p.p.m.) | |
|---|---|---|---|
| | | Oxygen | Nitrogen* |
| 13 | Ta-1Y | 1,050±50 | 610±45 |
| 14 | W-Th (conventional) | 2,000±50 | 1,150±45 |

*The effect of the yttrium content of the electrode on interstitial nitrogen content of the final melt product is more readily observable at the high initial nitrogen contents of these examples.

The average Brinell hardness number of these products was 5 for the melt product of Example 13 and 23 for the melt product of Example 14.

The following examples describe additional electrodes within the scope of this invention, which satisfy its objects and yield its new and useful results.

Example 15

The electrode of this example is composed of 15% by weight of tantalum, 1% by weight of zirconium, 0.8% by weight of yttrium, and the balance essentially columbium (Cb-15Ta-1Zr-0.8Y).

Example 16

The electrode of this example is composed of 1.5% by weight of yttrium and the balance essentially titanium (Ti-1Y).

*Example 17*

The electrode of this example is composed of 2% by weight of yttrium and the balance essentially titanium (Ti–2Y).

*Example 18*

The electrode of this example is composed of 1% by weight of yttrium and the balance essentially zirconium (Zr–1Y).

*Example 19*

The electrode of this example is composed of 1.5% by weight of yttrium and the balance essentially vanadium (V–1.5Y).

*Example 20*

The electrode of this example is composed of 2% by weight of yttrium and the balance essentially molybdenum (M0–1Y).

*Example 21*

The electrode of this example is composed of 5% by weight of yttrium and the balance essentially chromium (Cr–1Y).

*Example 22*

The electrode of this example is composed of 3% by weight of yttrium and the balance essentially hafnium (Hf–1Y).

*Example 23*

The electrode of this example is composed of 0.8% by ewight of yttrium and the balance essentially tungsten (W–0.8Y).

*Example 24*

The electrode of this example is composed of 2.5% by weight of yttrium, 10% by weight of tungsten, 5% by weight of molybdenum, 5% by weight of hafnium, and the balance essentially columbium (Cb–10W–5M0–5Hf–2.5Y).

*Example 25*

The electrode of this example is composed of 10% by weight of yttrium and the balance essentially tungsten (W–10Y).

*Example 26*

The electrode of this example is composed of 5% by weight of yttrium and the balance essentially zirconium (Zr–5Y).

*Example 27*

The electrode of this example is composed of 1.5% by weight of zirconium, 2% by weight of yttrium, and the balance essentially vanadium (V–2Y–1.5Zr).

*Example 28*

The electrode of this example is composed of 1.5% by weight of zirconium, 2% by weight of yttrium, and the balance essentially tantalum (Ta–2Y–1.5Zr).

*Example 29*

The electrode of this example is composed of 1.5% by weight of zirconium, 2% by weight of yttrium, and the balance essentially molybdenum (M0–2Y–1.5Zr).

*Example 30*

The electrode of this example is composed of 1.5% by weight of zirconium, 2% by weight of yttrium and the balance essentially tungsten (W–2Y–1.5Zr).

When any reference is made herein to parts or percentages of particular materials, it is intended that this shall mean parts or percentages by weight, unless otherwise specifically indicated.

The invention, in its broader aspects is not limited to the specific details shown and descrbed, but departures may be made from such details within the scope of the accompanying claims without departing from the principles of the invention and without sacrificing its chief advantages.

What is claimed is:

1. A nonconsumable arc-melting and arc-welding electrode for use in melting and welding reactive-refractory metal compositions, the electrode being formed of a composition consisting essentially of from 0.5 to 10% by weight of yttrium, and balance essentially a reactive-refractory metal composition selected from the group consisting of titanium, zirconium, metals having a melting point of at least 1875° C., and alloys having at least one of the metals of said group as their base.

2. The product of claim 1 wherein said electrode composition contains from 0.5 to 3% yttrium.

3. The product of claim 1 wherein said electrode composition contains from 0.7 to 1% yttrium.

4. The product of claim 1 wherein said electrode composition contains about 0.8% yttrium.

5. The product of claim 1 wherein said electrode is formed of a composition consisting essentially of from 0.5 to 10% by weight of yttrium, and balance a reactive-refractory metal composition selected from the group consisting of columbium and columbium-base alloys.

6. The product of claim 1 wherein said electrode is formed of a composition consisting essentially of from 0.5 to 10% by weight of yttrium, and balance a reactive-refractory metal composition selected from the group consisting of molybdenum and molybdenum-base alloys.

7. The product of claim 1 wherein said electrode is formed of a composition consisting essentially of from 0.5 to 10% by weight of yttrium, and balance a reactive-refractory metal composition selected from the group consisting of tungsten and tungsten-base alloys.

8. The product of claim 1 wherein said electrode is formed of a composition consisting essentially of from 0.5 to 10% by weight of yttrium, and balance a reactive-refractory metal composition selected from the group consisting of tantalum and tantlum-base alloys.

9. The product of claim 1 wherein said electrode is formed of a composition consisting essentially of from 0.5 to 10% by weight of yttrium, and balance a reactive-refractory metal composition selected from the group consisting of zirconium and zirconium-base alloys.

10. A nonconsumable arc-melting and arc-welding electrode for use in melting and welding reactive-refractory metal compositions, the electrode being formed of a composition consisting essentially of about 0.8% by weight of yttrium, about 1% by weight of zirconium, balance essentially columbium.

11. In a process for arc-melting reactive-refractory metal compositions selected from the group consisting of titanium, zirconium, metals having a melting point of at least 1875° C. and alloys thereof, wherein a nonconsumable electrode is placed adjacent the metallic composition to be melted and an electric current is passed through the electrode and the metallic composition to establish an electric arc between them, the improvement which comprises: employing an electrode consisting essentially of from 0.5 to 10% by weight of yttrium, and balance essentially a reactive-refractory metal composition selected from the group consisting of titanium, zirconium, metals having a melting point of at least 1875° C., and alloys having at least one of the metals of said group as their base.

12. The process of claim 11 wherein the arc-melting is carried out under a dynamic vacuum of from 400 to 800 microns.

13. The process of claim 11 wherein the base metal of said electrode is the same as the base metal of the composition being melted.

14. The process of claim 13 wherein said base metal is columbium.

15. In a process for arc-melting reactive-refractory metallic compositions selected from the group consisting of titanium, zirconium, metals having a melting point of at least 1875° C., and alloys thereof, wherein a non-consumable electrode is placed adjacent the metallic composition to be melted and an electric current is passed through the electrode and the metallic composition to establish an electric arc between them, the improvement which comprises: employing an electrode consisting essentially of from 0.5 to 3% by weight of yttrium, and balance essentially a reactive-refractory metal composition selected from the group consisting of titanium, zirconium, metals having a melting point of at least 1875° C., and alloys having at least one of the metals of said group as their base.

16. The process of claim 15 wherein the arc-melting is carried out under a dynamic vacuum of from 400 to 800 microns.

17. The process of claim 15 wherein the base metal of said electrode is the same as the base metal of the composition being melted.

18. The process of claim 17 wherein said base metal is columbium.

19. The process of claim 15 wherein said electrode contains 0.7% to 1% by weight of yttrium.

20. The process of claim 19 wherein said electrode contains about 0.8% yttrium.

References Cited
UNITED STATES PATENTS

| | | | |
|---|---|---|---|
| 2,744,183 | 5/1956 | Conant | 219—45 X |
| 2,825,703 | 3/1958 | Conant | 75—176 X |
| 3,138,453 | 6/1964 | Poster et al. | 75—65 |

RICHARD M. WOOD, *Primary Examiner.*

B. A. STEIN, *Assistant Examiner.*